July 5, 1960  A. GALVIN ET AL  2,944,083
MANUFACTURE OF METHYLETHYLKETONE
Filed Sept. 25, 1957  2 Sheets-Sheet 1

United States Patent Office 2,944,083
Patented July 5, 1960

2,944,083

MANUFACTURE OF METHYLETHYLKETONE

André Galvin, Saint-Avre-La-Chambre, Paul Besson, La Chambre, Pierre Brun, Saint Avold, and Pierre Thirion, Saint-Avre, France, assignors to Societe Industrielle des Derives de l'Acetylene (S.I.D.A.), Paris, France, a corporation of France Filed Sept. 25, 1957, Ser. No. 686,197

Claims priority, application France Aug. 5, 1954

6 Claims. (Cl. 260—596)

The present invention relates to the manufacture of methyl-ethyl-ketone. It has the more particular object of the production of very pure methyl-ethyl-ketone by catalytic de-hydrogenation of secondary butanol in the vapour phase with a small expenditure of heat energy and under conditions of very high yield.

It is well known that methyl-ethyl-ketone can be prepared from secondary butanol either by oxidation through the use of an oxidizing agent, or by de-hydrogenation.

When secondary butanol is oxidized, there are obtained as resulting products methyl-ethyl-ketone and water which form an azeotrope at about 11% of water, the separation of which by distillation is not possible. The methods employing this oxidation method in the liquid phase or in the vapor phase thus only permit of the production by distillation of a product highly charged with water.

The methods which employ de-hydrogenation can be carried out in the liquid phase or in the vapor phase. In the vapor phase they produce vapors of methyl-ethyl-ketone in mixtures with various other gases or vapors, mainly the butanol which has not reacted, hydrogen formed during the course of the reaction and also, in smaller quantities, the vapors of the by-products either formed during the catalysis or pre-existing, steam from pre-existing water and eventually small quantities of nitrogen, carbonic acid gas, carbon monoxide, etc.

It is well known that the current practice is to surface-cool the gaseous mixture obtained during the course of this reaction in the vapor phase and thus to condense the greater part of the vapors, and then to wash the residual gases with water in order to collect the useful vapors which have been carried away by these gases.

The methods of de-hydrogenation in the vapor phase have a certain number of differences from the methods of catalytic conversion of butanol in the liquid phase: in particular they are carried out at a higher temperature and have the advantage that, without substantial variations in the efficiency of conversion of the butanol, they enable the concentration of the methyl-ethyl-ketone in the whole of the organic vapors to be brought by regulation of the time of contact during the catalysis, to a value comprised at will between 80 and 100%. For their part, the methods operating in the liquid phase produce a gaseous mixture containing, under the best economic conditions, about 185 mols of non-converted butanol for every 100 mols of methyl-ethyl-ketone produced. It can thus be seen that there is a very important difference between these two types of methods. The separation of the methyl-ethyl-ketone from gases issuing from the reaction zone is thus much simpler in the case of the reaction in the gaseous phase.

In the known methods, the extraction of pure methyl-ethyl-ketone from products resulting from the condensation and additionally from subsequent washing stages, is generally effected by a number of successive distillations which separate the methyl-ethyl-ketone from the water, from the unreacted alcohol, and from the by-products such as aldehydes, esters, etc.; in addition, it is generally sought to condense these by-products or these impurities in order to recover them.

These successive distillation stages are costly by reason of the large consumption of heating steam which is necessitated by the high values of retrogression ratios which it is necessary to employ, and by reason of the large capital expenditure in the form of columns, condensers and tanks which they involve; in addition, they result in losses of the product. In the case of a catalytic de-hydrogenation in the vapor phase, delivering a mixture of vapors and gases, in which the methyl-ethyl-ketone represents 85% of the organic vapors, the separation of these latter with an efficiency of 95% by the standard method of violent condensation and re-distillation of the liquids, without washing with water, requires a minimum of 1.39 kgs. of heating steam per kg. of separated methyl-ethyl-ketone; in practice, the consumption is even higher. It can be seen in consequence that starting with the same gas with an efficiency of separation of 98%, and while obtaining still purer methyl-ethyl-ketone, the method of the present invention consumes in practice less than 0.6 kg. of heating steam per kg. of methyl-ethyl-ketone produced. Finally, the costs of labour and of supervision involved in the successive distillations are also considerable by reason of the complexity of the apparatus, the large floor space occupied and the risks of fire.

In the text which follows below, for reasons of simplicity, methyl-ethyl-ketone will frequently be referred to by its usual abbreviation "M.E.K." and the secondary butanol will be referred to as "butanol."

The present invention has for its object a method of separation of the raw products resulting from the catalytic de-hydrogenation of secondary butanol in the vapor phase, with a view to the production of very pure methyl-ethyl-ketone, this method enabling the drawbacks referred to above to be obviated.

The method of the invention consists in the introduction in a continuous manner, without previous condensation, of the mixture passing out of a catalytic furnace for the de-hydrogenation of secondary butanol into a fractionating column working by retrogression, in separating on the one hand at the base of the column the heavy organic by-products and the unconverted butanol, which is returned to the catalytic reaction; and on the other hand, at the top of the column, a mixture of methyl-ethyl-ketone and non-condensable inert gases; and in then condensing the methyl-ethyl-ketone so as to separate it from the said non-condensable inert gases. These non-condensable inert gases can subsequently be treated in order to extract from them the M.E.K. vapor which has been carried away with them, and to this end these gases are re-compressed and first washed with a flow of previously-cooled secondary butanol intended to be employed as the raw material in the catalytic de-hydrogenation furnace, and then with the heavy products extracted from the base of the fractionating column, with the object of eliminating therefrom the secondary butanol vapors which they have carried away with them during the course of the first washing operation.

The M.E.K. which is condensed at the outlet of the retrogression column may be subjected, if so desired, to a further distillation with the object of removing the traces of light products which are mainly introduced by the butanol employed. This distillation consumes very little heating steam.

The direct distillation, without condensation or previous washing of the mixture of non-condensable inert gases and the organic vapors resulting from the de-hydrogenation reaction, enables the best use to be made of the sensible and latent heats contained in the reaction products for the purposes of distillation.

The presence of non-condensable gases in the mixture which is subjected to distillation enables, for its part, the partial vapor pressure of the M.E.K. to be reduced, which correspondingly reduces the distillation temperature of the M.E.K. The reflux ratio to be employed during the retrogression is thus reduced, together with the expenditure of heat and also the number of trays in the distillation column. In order to increase this effect, it is an advantage, in accordance with a further arrangement of the invention, to inject a fraction of the separated and washed inert gases into the base of the distillation column.

It is well known that for a desired quality of the finished product, and for a given number of trays in a distillation column, the consumption of heating steam for the distillation is determined by the ratio R between the weight of the organic vapors rising upwards inside the column, and the weight of the liquids re-introduced at the head of the said column. This ratio depends first of all in a calculable manner on the form of the curves of liquid/vapor equilibrium under the conditions of the distillation in presence of the gases. The applicants have observed that it depends, in addition, in an unpredictable manner, on the dynamic effect due to the difference between the speeds of diffusion in the gaseous phase of the vapors produced in the liquid phase.

The invention will now be described in more detail, reference being made to the accompanying drawings, in which.

Figure 1:
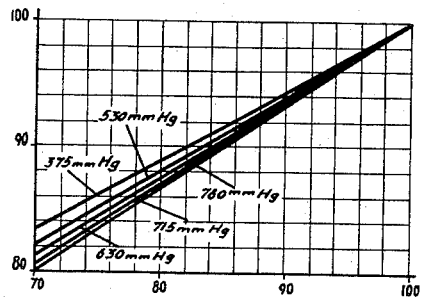
Fig. 1 is a diagram showing the curves of liquid-vapor equilibrium of the mixtures of M.E.K. and secondary butanol at different total pressures.

Fig. 1 shows the outlines of the static liquid-vapor equilibrium curves of the mixtures of M.E.K. and butanol obtained with an Othmer apparatus for the total vapor pressures of 760, 715, 630, 530 and 375 mm. of mercury. The percentages of the molecules of M.E.K. in the liquid are plotted as abscissae, whilst the same percentages for the gaseous phase are plotted as ordinates. As can be seen, low pressures are very favorable to the separation of the two substances since the maximum possible ratio R is respectively 1.51; 1.54; 1.60; 1.67 and 1.81 for 760, 715, 630, 530 and 375 mm. of mercury. These figures assume an infinite number of trays in the column.

If these figures are converted to kilograms of heating steam to be expended per kilogram of pure product manufactured, and with the hypothesis that 5% of the pure product manufactured is carried away by the gases, the following respective figures are obtained: 0.63; 0.60; 0.56; 0.52 and 0.47.

Figure 2:
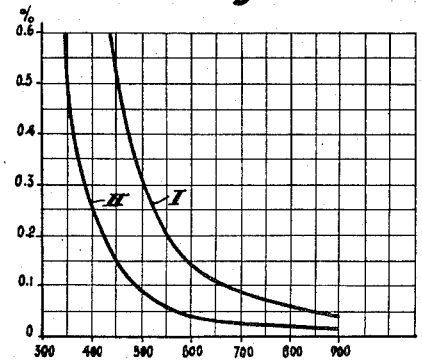
Fig. 2 is a diagram showing the content of butanol in the M.E.K. at the head of the distillation column as a percentage function of the consumption of heat required to heat this distillation column.

If now in the case of a distillation column of 21 theoretical trays which receives at its base organic vapors having a molar content equal to 85% of M.E.K., mixed in the proportion of one molecule of non-condensable gases to one molecule of M.E.K. (which are the conditions obtained during the catalysis in practice), the residual content of butanol in the M.E.K. at the head of the distillation column can be shown as a function of the calorific consumption in heating this column, expressed in calories per kilogram of M.E.K. extracted. The diagram of Fig. 2 shows this relation as curve II. The curve I of Fig. 2 shows the same residual content in the case in which the column is supplied by organic vapors having the same composition, not mixed with gas.

The comparison of these two curves clearly shows the advantages of the method in accordance with the invention, for the production of M.E.K. of high quality at a low cost in heating energy.

As has already been indicated, it may be an advantage, in accordance with the present invention, to amplify the effect of the non-condensable gases passing out of the dehydrogenation reaction, by introducing into the base of the distillation column a further quantity of gases derived from a point after their purification. This additional recycling of the gases permits, with an equal consumption of vapors, of a reduction in the number of trays in the lower part of the distillation column, and of an increase in the upper part of the same column in the effect of the gases directly issuing from the catalysis furance.

The applicants have found by experiments that, contrary to opinions generally held at the present time, the gases which are present or which are introduced do not adversely affect the distillation process either in respect of its effectiveness or in its production capacity. As already stated above, it is also seen that the ratio R also depends in a manner which cannot be predicted by calculation, on the dynamic effect due to the difference between the speeds of diffusion in the gaseous phase of the vapors emitted by the liquid phase. In fact, the figures obtained by the present method are more favorable than those which would result from the curves of Figs. 1 and 2, which have only been given by way of indication.

The applicants have also observed that the dehydrogenation in the catalytic furnace is not disturbed by the traces of by-products or by the ME.K. present in the butanol which has been employed to carry away the M.E.K. vapors remaining in the non-condensable gases after condensation of the greater part of the M.E.K. Experience has also proved to them that the gases washed in accordance with the invention by the butanol, and then by the heavy by-products separated out during the distillation, are pure enough to be utilized for the dehydrogenation reaction after simply washing with water.

The washing of the non-condensable gases with butanol and then with the heavy by-products may be effected equally well at normal pressures or under pressure; it may be an advantage to compress the gases freed from the greater part of the M.E.K. by condensation but remaining saturated with M.E.K. vapors in order to complete the elimination of the latter. The applicants have in fact found that an increase in pressure was very favorable to the efficacity of the washing of these gases, first of all with liquid butanol and then by the heavy by-products. Although any positive pressure may be employed, experience has shown that a pressure between 600 and 1,000 grams per sq. cm. gives adequate results, and is easy to obtain.

Figure 3:
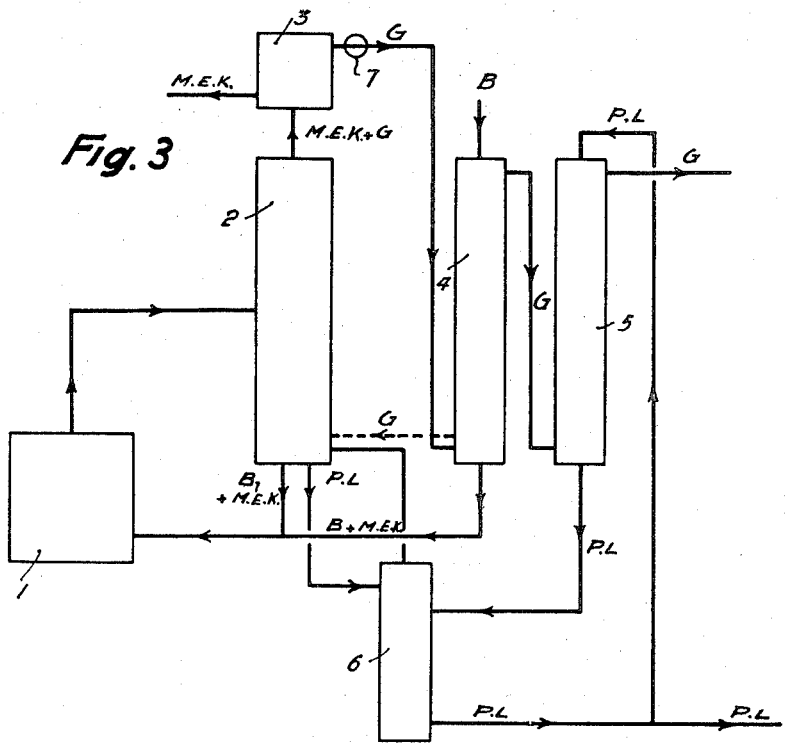
Fig. 3 is a diagrammatic apparatus arrangement, showing the successive stages of the method in accordance with the invention.
Figure 4:
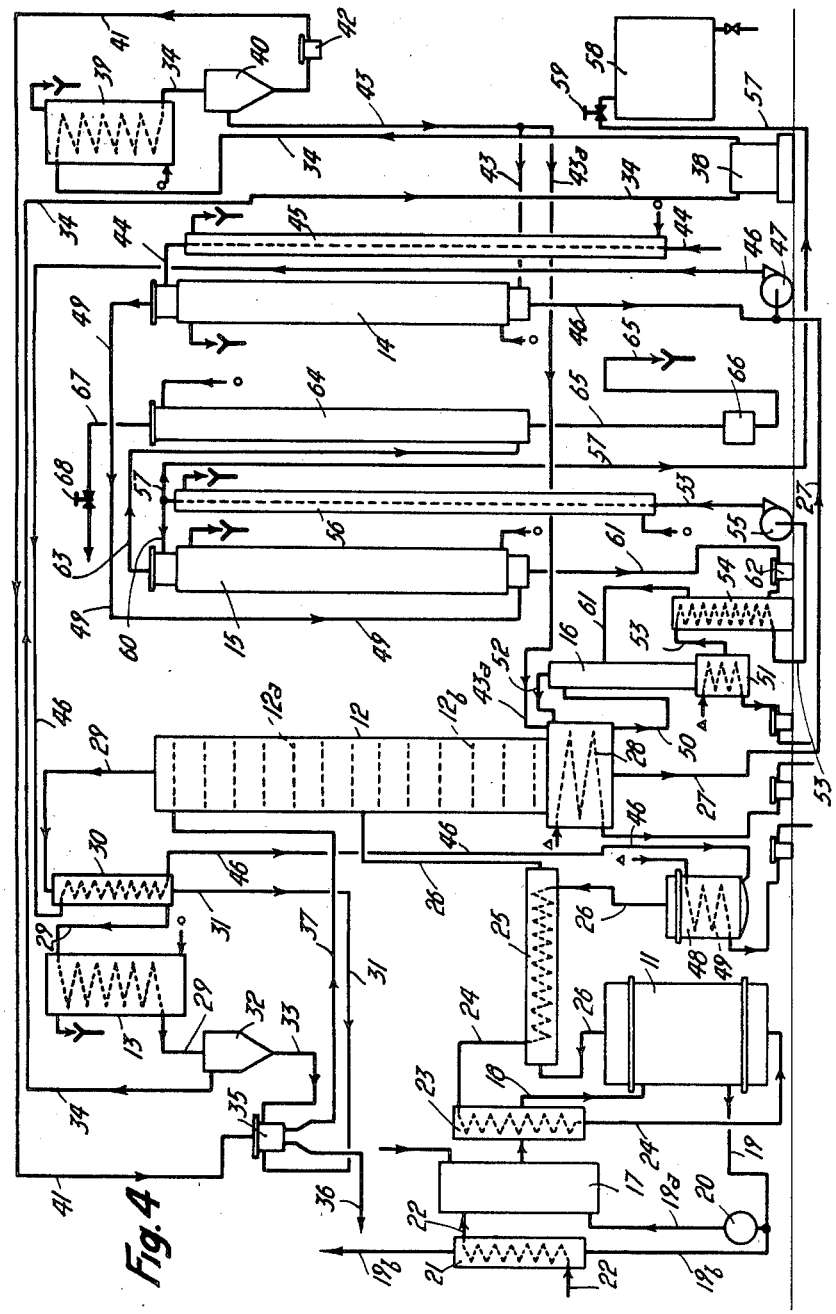
Fig. 4 is a diagrammatic view in elevation of an apparatus installation for carrying the invention into effect; in this figure, all the water-feed points are indicated by a small circle, and the steam-supply points by a small triangle.

In order to simplify the description of the invention, there has been shown in Fig. 3 a diagram giving the successive stages of the method in accordance with the invention, and in Fig. 4 a diagrammatic view in elevation of an installation for carrying the invention into effect. In Fig. 4, the water-supply points are indicated by a small circle and the steam-supply points by a small triangle.

Referring to Fig. 3, it is seen that an installation for carrying the method into effect comprises essentially a catalytic de-hydrogenation furnace 1, a distillation column 2, a condenser 3, two washing towers 4 and 5 and an auxiliary distillation column 6 for the concentration of the concentration of the heavy products separated at the base of the distillation column 2.

The de-hydrogenation furnace 1 is supplied with butanol to be converted and delivers a gaseous mixture at high temperature, constituted by M.E.K. vapors, unconverted butanol, heavy by-products and non-condensable inert gases which are mainly constituted by hydrogen and partly by other gases such as nitrogen, carbon dioxide, carbon monoxide. In usual practice, these gases are at a temperature in the vicinity of 300° C., and the content of M.E.K. in the organic portion is comprised between 80% and 100%.

This gaseous mixture is sent without previous condensation to the centre of the distillation column 2. The M.E.K. and the mixture of non-condensable gases (G) escapes to the upper portion of this column, whilst at its lower portion are collected the heavy products (P.L.) mixed with butanol which has not reacted. The latter ($B_1$) is loaded with a small quantity of dissolved M.E.K. which is returned to the catalysis furnace 1 ($B_1$+M.E.K.) in which it does not interfere with the de-hydrogenation.

The mixture of M.E.K. vapor and non-condensable inert gases (M.E.K.+G) which passes out of the head of the distillation column 2 is lead to the condenser 3, in which is effected the condensation of the greater part of the M.E.K. The M.E.K. thus condensed is collected in order to be eventually re-distilled so as to remove the traces of light products which are mainly introduced by the raw material. The gases (G) which contain a small amount of M.E.K. in the form of vapor, are sent to the base of the washing tower 4, in which they meet in counter-flow the butanol (B) which constitutes the raw material. The latter washes the gases and frees them from practically the whole of the M.E.K. which they had carried away and is then sent (B+M.E.K.) to the catalysis furnace, at the same time as that ($B_1$+M.E.K.) which was collected at the base of the column 2. In this column 4, the gases have been freed of the M.E.K. which they still contained, but are saturated with butanol. They are then sent to the base of the second washing tower 5, in which they meet in counter-flow the heavy products (P.L.) which have been extracted at the base of the column 2 and then concentrated in the auxiliary distillation column 6. The gases (G) thus free from the butanol vapors which they had carried away during their passage into the column 4, are evacuated so as to be eventually employed, whilst the heavy products (P.L.+B) are returned to the distillation column 6.

A part of the heavy products collected at the outlet of the column 6 is withdrawn from the circuit. The butanol carried away by the heavy products into the column 5 and separated from these latter in the column 6, is returned to the circuit at the base of the column 2.

In order to employ the best range of pressures, a compressor 7 is preferably coupled to the outlet of the condenser 3 so as to compress the gases freed from the greater part of the M.E.K.

*Example 1*

Fig. 4 shows an installation which can serve as an example of the application of the method in accordance with the invention. Here there can again be seen the catalytic furnace 11, the distillation column 12, the condenser 13, the washing towers 14 and 15, and the auxiliary column 16. The dehydrogenation furnace 11 is provided with a heating circuit enabling the temperature in the furnace to be brought up to 400° C. This heating circuit comprises a combustion chamber 17, a conduit 18 for bringing the hot gases of combustion into the furnace 11, an extraction conduit 19 for these gases, dividing into a return conduit 19a to the chamber 17, in which is interposed a fan 20, and a conduit 19b for partial evacuation to the atmosphere, in which is interposed a heat-exchanger 21 which heats the air of combustion brought in by a conduit 22 to the chamber 17. In the conduit 18 is interposed a heat-exchanger 23 which serves to heat the butanol vapors employed as raw materials; these vapors are brought into the exchanger 23 through a conduit 24 preceded by a further heat-exchanger 25; the latter is mounted on the conduit 26 which brings the products of the reaction in the furnace 11 to the column 12 and permits of a partial recovery of the sensible heat of the products passing out of the furnace, while avoiding any condensation.

In operation, the furnace 11 received 242 kg. per hour of butanol charged with about 13 kgs. of re-cycled M.E.K.

The products passing out of the furnace were constituted by 200 kgs. per hour of M.E.K., 35 kgs. per hour of butanol, traces of heavy products, and inert gas composed essentially of 60 cu. m. per hour of hydrogen. The temperature at the outlet of the furnace was 400° C. The cooler 25 cooled this gaseous mixture down to 250°, which temperature is greater than that of the initiation of condensation of the mixture. The gases thus arrived without previous condensation in the distillation column 12. The latter comprises an upper portion 12a comprising 30 to 35 trays in which the M.E.K. is concentrated, and a lower portion 12b comprising 14 to 18 trays in which the unconverted butanol is exhausted and the heavy products are condensed. This butanol and these heavy products which carry away the dissolved M.E.K., are evacuated by the conduit 27 with a view to them being recycled, as will be described below. The heating of the column 12 was effected by means of a steam coil 28. In these circumstances, the temperatures at the head, at the level of the intake of the gases, and at the base of the column 2 were respectively 72°, 77° and 98°.

The gases and the vapors of M.E.K. thus freed from butanol passed out at the head of the upper portion 12a of the column and were led through a conduit 29 in which is interposed a heat-exchanger 30, to the condenser 13, cooled by water circulation. The condensation of the M.E.K. begins in the exchanger 30, in which circulates the butanol intended to be sent into the furnace 11 in the manner which will be explained later. The M.E.K. condensed at 30 was extracted through a conduit 31. The condensation was practically completed in the condenser 13. At the outlet of this latter, the conduit 29 delivers into a separator 32 in which the separation took place of the condensed M.E.K., evacuated through a conduit 33 at the rate of 190 kgs. per hour, and also of the non-condensable inert gases saturated with M.E.K. vapor, and evacuated through a conduit 34

The evacuation conduits 31 and 33 for the M.E.K. condensed at 30 and at 13 terminate in a reflux distributor 35 of a type known per se, which comprises two outlet conduits 36 and 37. The evacuation conduit 36 allows the evacuation of the M.E.K. produced by means of a distillation column for the light products, which consumes 20 to 40 kgs. per hour of steam, depending on the quality of the butanol employed; the conduit 37 returns to the head of the upper portion 12a of the column 12. The reflux distributor 35 was regulated in such manner that the ratio R of the quantity of M.E.K. recycled through the conduit 37 to the quantity evacuated through the conduit 36 was 2.5.

The liquid mixtures of butanol and M.E.K. which pass into the column 12b become exhausted in M.E.K. and pass out of the column with the following approximate composition: butanol—85 to 95%; M.E.K.— 4 to 10%; heavy by-products—1 to 5%.

The non-condensable gases pass out of the condenser 13 through a conduit 34 in which is interposed a compressor 38 (shown at 7 in Fig. 1) which compresses them to an absolute pressure of 1.8 kgs. They pass into a cooler 39 in which a portion of the M.E.K. vapors is condensed, and then into a separator 40 in which is effected the separation of the M.E.K. condensed at 39 which quantity is returned through a conduit 41 provided with a drain-cock 32 to the reflux distributor 35. The gases thus freed from a part of the M.E.K. which they have carried away at the outlet of the condenser 13 are sent through a conduit 43 at the base of the washing tower 14, cooled by a water-circulation jacket. In this tower, they meet in counterflow with the butanol used as the raw material, which was introduced at 44 at a temperature of 20° C. The quantity of butanol introduced was 198 kgs. per hour. A portion of the gases passing out of the separator 40, comprised between 30% and 50%, was re-cycled through a conduit 43 to the base of the lower portion 12b of the column 12.

In the tower 14, the butanol became charged with 3 to 10% of M.E.K. The temperature inside the tower was 25° C. The butanol evacuated at the base of the tower 14 passes through a conduit 46 to which is coupled the conduit 27 for re-cycling the butanol recovered at the base of the distillation column 12. In the conduit 46 is coupled a pump 48 which sends the butanol coming from the tower 14 and from the conduit 27 to the heat-exchanger 30. In this exchanger, the butanol is heated to 65° C., while recovering part of the heat contained in the gaseous mixture which passed out of the top of the column 12. The butanol is then led to an evaporator 47, heated by a steam coil 49, and then through the conduit 26 towards the furnace 11.

In the tower 14, the non-condensable gases free themselves from the M.E.K. vapors which they have carried away with them to that point, but become charged with butanol vapor. They pass out of the tower 14 through a conduit 49 which leads them to the bottom of the washing tower 15, also cooled by a water-circulation jacket. In this tower, which was maintained at a temperature of 25° C., the gases meet in counter-flow the heavy products separated in the distillation column 12. These heavy products have been derived from the base of the lower portion 12b of the column 12 through a conduit 50 which terminates at the head of an exhaustion column 16 heated by a steam coil 51. This column 16 comprises about 10 trays. The quantity of liquid thus drawn-off through the conduit 50 was 40 kgs. per hour. This liquid contains butanol in addition to the heavy products. The butanol separated in the column 16 is returned to the column 12 through a conduit 52. The heavy products concentrated in the column 16 are evacuated at its base through a conduit 53 which passes through a heat-exchanger 54, and in which is interposed a pump 55 which delivers the heavy products to a water-circulation cooler 56. The temperatures at the head and at the foot of the column 16 were about 98° C. and 120° C. respectively.

At the outlet of the cooler 56, a part of the heavy products is continuously evacuated through a conduit 57 towards a storage tank 58, passing through an automatic valve 59 which regulates the boiler of the column 16 to a constant level. The quantity thus evacuated was 0.3 to 1.0 kg. per hour. The remainder of the heavy products, or 50 kgs. per hour, is sent through a conduit 60 to the head of the washing tower 15 in which they free the non-condensable gases from the butanol which the former have carried away into the tower 14. At the base of this tower 15, the liquid charged with butanol is passed into a conduit 61 which leads it back to the column 16 after passing through a drainage valve 62 and through an exchanger 53 in which it takes up the heat given up by the heavy products passing out of the said column 16 through the conduit 52.

The non-condensable gases, mainly constituted by hydrogen, have been freed from their butanol in the tower 15. They are washed with water in a washing tower 64, from which they are evacuated towards their place of utilization by means of a valve 68, enabling a pressure of 1.8 kgs. to be maintained in the towers 14, 15 and 64.

To sum up 198 kgs. per hour of butanol was used at a cost of a total expenditure of steam of 95 to 115 kgs. per hour for the distillation.

There was obtained on the one hand 190 kgs. of M.E.K. at a titration of more than 99.5%, corresponding to commercial standards, 0.5 kg. of heavy products, and 60 cu. m. of practically pure hydrogen gas.

The consumption of steam in the columns 12 and 16 amounting to only 75 kgs. per hour in the total consumption, the remainder was consumed by the additional column in order to remove the light products.

*Example 2*

The operations were carried out in an installation similar to that which has been described for Example 1. There was obtained at the furnace a mixture containing 95% of M.E.K. in the organic portion, at a temperature at the outlet of the furnace of 420° C. The gases and vapors passed out of the cooler 25 at a temperature of 250° C. The quantity of heavy products delivered through the conduit 57 amounted to 0.8 kg. per hour. The reflux distributor 35 was regulated in such manner that the ratio R of the quantity of M.E.K. re-cycled through the conduit 37 to the quantity evacuated through the conduit 36 was 2.4. The pressure in the towers 14, 15 and 64 was 1.8 kgs. With a consumption of 215 kgs. per hour of butanol, there was obtained a quantity of 200 kgs. per hour of M.E.K. at a purity of more than 99.5%. The total consumption of steam was 90 to 110 kgs. per hour, of which only 70 kgs. per hour were required for the columns 2 and 6. The temperatures in the columns and the other data remained the same as for Example 1.

*Example 3*

The operations were again carried out in an installation similar to that described for Example 1. There was obtained at the furnace a mixture containing 85% of M.E.K. in the organic portion, at a temperature of 400° C. at the outlet of the furnace. The cooler 25 was eliminated and the mixture passed into the column at 350° C. The quantity of M.E.K. produced, with a purity greater than 99.5% was 400 kgs. per hour. The consumption of butanol was 420 kgs. per hour, and the quantity of heavy products delivered was about 1 kg. per hour.

The reflux distributor 35 was regulated to give a ratio R of 2.5. The total consumption of steam for the distillation was 160 to 200 kgs. per hour, of which only 120 kgs. per hour were required for the columns 12 and 16.

This is a continuation in part of our co-pending application Serial No. 524,722 filed July 27, 1955, now abandoned.

What we claim is:

1. A method of manufacturing pure anhydrous methyl-ethyl-ketone by catalytic dehydrogenation of secondary butanol in the vapor phase, comprising reacting vaporous secondary butanol in a catalytic dehydrogenation furnace to form a nonaqueous mixture of vaporous methyl-ethyl-ketone, vaporous heavy organic by-products, vaporous unconverted secondary butanol and non-condensable inert gases, moving said mixture from the furnace directly to a fractionating column having top and bottom outlets to utilize the sensible and latent heats of the mixture to separate the constituents of the vaporous mixture by fractional condensation; injecting additional non-condensable inert gases into the fractionating column during said separation to reduce the reflux ratio and the temperature of separation; removing the heavy organic by-products and unconverted butanol from said bottom outlet of the column; removing a mixture containing anhydrous vaporous methyl-ethyl-ketone and non-condensable gases from said top outlet of the column; and condensing and collecting the methyl-ethyl-ketone from the last-mentioned mixture.

2. A method of manufacturing pure anhydrous methyl-ethyl-ketone by catalytic dehydrogenation of secondary butanol in the vapor phase, comprising reacting vaporous secondary butanol in a catalytic dehydrogenation furnace to form a nonaqueous mixture of vaporous methyl-ethyl-ketone, vaporous heavy organic by-products, vaporous unconverted secondary butanol and non-condensable inert gases, moving said mixture from the furnace directly to a fractionating column to utilize the sensible and latent heats of the mixture to separate the constituents of the vaporous mixture by fractional condensation; injecting additional non-condensable inert gases into the fractionating column during said separation to reduce the reflux ratio and the temperature of separation; removing the heavy organic by-products and unconverted butanol from the base of the column; removing a mixture consisting essentially of vaporous methyl-ethyl-ketone and non-condensable gases from the head of the column; condensing and collecting the methyl-ethyl-ketone from the last-mentioned mixture, then washing said non-condensable gases with a countercurrent flow of secondary butanol to remove any methyl-ethyl-ketone vapors retained in said gases, utilizing the last mentioned secondary butanol as a feed material for said furnace; then washing said gases with the heavy organic by-products extracted at the base of said fractionating column, said by-products removing any secondary butanol vapors retained in said gases during the first washing step; then concentrating the last mentioned heavy organic by-product to remove any secondary butanol therefrom, and feeding the last mentioned butanol to said fractionating column.

3. A method as recited in claim 2 wherein said heavy organic by-products are concentrated to remove butanol therefrom prior to washing the gases with the by-products.

4. A method as recited in claim 2 wherein said reflux ratio is between about 2.4–2.5.

5. A method as recited in claim 2 wherein the washing of the gases is performed at a pressure between about 600–1,000 grams per square centimeter.

6. A method of manufacturing pure anhydrous methyl-ethyl-ketone by catalytic dehydrogenation of secondary butanol in the vapor phase, comprising reacting vaporous secondary butanol in a catalytic dehydrogenation furnace to form a nonaqueous mixture of vaporous methyl-ethyl-ketone, vaporous heavy organic by-products, vaporous unconverted secondary butanol and non-condensable inert gases at a temperature at least about 400° C., cooling said mixture while maintaining it in a vaporous state; introducing the cooled vaporous mixture into a fractionating column having an upper portion for concentrating the methyl-ethyl-ketone and a lower portion for concentrating the heavy organic by-products; said column having upper and lower outlets; maintaining a reflux ratio of between about 2.4–2.5 in said column; withdrawing essentially methyl-ethyl-ketone and the inert gases from said upper outlet, withdrawing the heavy organic products from the lower outlet of the column, condensing and removing said ketone from the inert gases which are saturated with ketone vapors; compressing said gases; washing the gases with a countercurrent flow of butanol to remove any of said ketone vapors therefrom; introducing between about 30% to 50% of the washed gases into the lower portion of the distillation column; then washing the remaining gases with said heavy organic products withdrawn from the column to remove any butanol vapors therefrom, and concentrating the heavy organic products used for washing to remove any butanol therefrom.

References Cited in the file of this patent

UNITED STATES PATENTS

| | | |
|---|---|---|
| 1,988,481 | Cardarelli | Jan. 22, 1935 |
| 2,402,875 | Cornell | June 25, 1946 |
| 2,456,683 | Deanesly | Dec. 21, 1948 |
| 2,829,165 | Coussemant | Apr. 1, 1958 |

FOREIGN PATENTS

| | | |
|---|---|---|
| 767,093 | Great Britain | Jan. 30, 1957 |